Patented Jan. 21, 1941

2,229,353

UNITED STATES PATENT OFFICE 2,229,353

CONVERSION OF HYDROCARBON OILS

Charles L. Thomas and Jacob E. Ahlberg, Chicago, Ill., assignors to Universal Oil Products Company, Chicago, Ill., a corporation of Delaware No Drawing. Application November 26, 1937, Serial No. 176,648.

17 Claims. (Cl. 196—52)

This invention relates more particularly to the conversion of hydrocarbon fractions produced in distilling petroleum oils and especially those of a distillate character which are vaporizable without substantial decomposition.

This application is a continuation-in-part of our earlier application serial No. 132,092, filed March 20, 1937.

In a more specific sense the invention is concerned with a modification of hydrocarbon oil conversion processes involving the use of particular and specific types of catalysts which function to selectively promote the formation of low boiling gasoline fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, there is much more to be learned about them. A considerable number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst.

The present invention is concerned with the use of catalytic materials which are specially adapted to accelerate the cracking of heavy distillate fractions of petroleum and other hydrocarbonaceous materials to increase the rate of production of high antiknock gasoline-boiling range fractions and gaseous by-products which contain unusually high percentages of readily polymerizable olefins which are a potential source of further gasoline yields. The preferred catalysts for the process are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises a method for converting hydrocarbon distillate fractions containing substantially no gasoline into material yields of gasoline and gases containing relatively high percentages of polymerizable olefins by subjecting the vapors of such distillates at elevated temperatures and substantially atmospheric pressure to contact with granular silica-alumina catalysts prepared by special methods of precipitation and/or mixing and further treated by special washes to remove substantially all alkali metal ions and calcined at elevated temperatures to produce highly refractory alumina-silica particles which are able to withstand for long periods of time the alternate service and reactivation periods.

We have found that the alumina-silica catalysts whose use characterizes the present cracking process and which may be prepared by several alternate methods described in more detail in succeeding paragraphs are rendered much more active and selective in accelerating gasoline-forming reactions in cracking when the originally precipitated hydrated alumina and hydrated silica which go to form the primary composites in various proportions are completely freed from alkali metal ions which in most instances will be sodium ions because the sodium salts of silicic acids are cheapest and most readily available for the manufacture of this type of catalyst. The primary step in the method of preparing the catalysts whose use in cracking characterizes the present invention may be varied somewhat and the following is a general summary of the alternative modes of operation which may be employed:

1. Solutions of soluble alkali metal silicates and soluble aluminum salts, the latter including soluble aluminates, may be mixed in varying proportions to jointly precipitate hydrated alumina and hydrated silica.

2. Hydrated silica and hydrated alumina may be separately precipitated and the precipitates mixed in the wet condition. In the case of silica a convenient method is to acidify a solution of an alkali metal silicate to precipitate a silica gel. In the case of alumina the desired hydroxide may be precipitated by the addition of alkalis particularly ammonium hydroxide although other precipitants such as ammonium carbonate, ammonium hydrosulfide or ammonium sulfide may be employed.

3. A separately precipitated hydrated silica may be added to an aqueous solution of an aluminum salt and the hydrated alumina precipitated in the presence of the suspended silica by the addition of alkaline precipitants.

4. A separately precipitated hydrated alumina may be added to an alkali metal silicate and the silica precipitated in the presence of the alumina by the addition of just the required amount of acid which is insufficient to redissolve the alumina.

It can be seen from the above that any method of obtaining a primary mix of hydrated silica and hydrated alumina may be employed within the scope of the invention although obviously the character and efficiency of the ultimately prepared alumina-silica masses will vary somewhat with the exact conditions of precipitation and the ratio of alumina to silica. For example, one proportion may furnish catalysts better for use in reforming a certain gasoline boiling range material, another may be better for use in the cracking of a gas-oil distillate and still another may be better adapted to cracking still heavier fractions.

An important feature of the present invention resides in the fact that cracking operations, particularly in the case of petroleum distillates, may be conducted with greatly increased efficiency when silica-alumina catalysts are employed which have been subjected to treatment to effect substantially complete removal of alkali metal ions from the primary hydrated alumina-silica masses prior to their calcining to prepare them for service. It is not known whether the alkali metal salts such as sodium are present in the primary hydrated composites in chemical combination or in an adsorbed state but it has been definitely determined that their removal is necessary if catalysts of superior value in accelerating cracking reactions are to be obtained. It is probable that the presence of these alkali metal ions causes a sintering or fusion of the surfaces of the primary composites during the drying period so that the porosity of the catalyst particles is much reduced with a corresponding reduction in effective surface, considering the catalytic effects to be due at least in part to surface action. However, such concepts are principally speculations in view of the difficulty of obtaining direct confirmatory evidence.

In preparing the catalyst for the process several alternative methods are available applicable to different primary hydrated silica-hydrated alumina composites to insure the substantially complete absence of sodium or other alkali metal ions. One method consists in washing the primary hydrated silica with sufficient quantities of hydrochloric acid to extract alkali metal by the formation of chlorides and possibly introduce hydrogen into the catalyst composites. Thus a precipitated hydrated silica mass may be first washed by decantation with water and filtered by pressure or suction to remove the major portion of the soluble impurities. The precipitate is then removed from the filter and treated with relatively dilute hydrochloric acid, washed any necessary number of times and again transferred to a pressure or suction filter and freed from the major portion of the adhering water. As an alternative method for removal of alkali metals which may be present in the chemically combined or adsorbed condition, the precipitated silica may be washed with solutions of ammonium chloride which apparently serves to replace sodium with ammonium, which is later volatilized in the drying and calcining of the silica either before or after admixture with the alumina. The desired amount of hydrated alumina may be precipitated on the siliceous material or freshly precipitated hydrated alumina may be added and mechanically mixed therewith.

Another method which has been found to be efficacious in the preparation of cracking catalysts consists in washing the primary hydrated silica-hydrated alumina precipitates or composites with solutions of ammonium compounds such as, for example, the chloride or other halides, the sulfate, the nitrate, or the acetate, so that the ammonium ion appears as a constituent of the catalyst composite and is later expelled from combination or adsorption in the calcining steps, leaving a structure of relatively high porosity in so doing. As a variation of this method, the co-precipitation or mixing of the primary hydrated silica and alumina may be brought about in the presence of ammonium hydroxide or any of the other salts of ammonium already mentioned in sufficient excess to insure an adequate removal of the alkali metal ion. In the case of co-precipitation it has been found that the necessary excess of ammonia is present at the point corresponding to a sufficient coagulation of the gel structure of the primary precipitates to permit ready filtering and washing. In other words if sufficient ammonia has been used to insure easy washing and filtering the alkali metal salts have been generally reduced to a point at which they no longer have any appreciable adverse influence on the catalyst properties.

The weight of evidence at hand on the mechanism leading to the replacement of alkali metals in the primary hydrated silica precipitates or the silica-alumina masses indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from that occurring in the case of zeolites.

A still further alternative method of removing alkali metal salts from freshly precipitated hydrated silica or alumina-silica composites consists in treating such composites with salts of metals which can replace the sodium in a similar manner to that described in the case of ammonium chloride. For example, a primary composite containing undesirably large amounts of alkali metal even after repeated water washing may be again suspended in water and treated with a solution of salts of such metals as aluminum, magnesium, calcium, manganese, cerium, or other multivalent metals in which the metal forms the positive ion of the salt being used. Obviously such replacements may be allowed to proceed only to the equivalent replacement of the alkali metal ion by these metals or further action may be permitted to proceed with consequent variation in the properties of the final catalyst. This method of operation permits the production of catalysts of a high degree of variability which are obviously non-equivalent in regard to their effect upon a given cracking reaction.

After a final washing of the hydrated alumina-silica mix, it is recovered as a filter cake by using any known type of suction or pressure filter and is then heated to a temperature of the order of 300° F. for a period of 36 to 48 hours after which it may be ground and sized to recover particles of a convenient average diameter or formed into any desired shapes by compression methods. It has been found that the drying at 300° F. produces material having a total water content of about 15% by weight which as already stated apparently corresponds to the best workability of the material. By calcining at cracking temperatures of the order of approximately 850–1000° F., a further dehydration occurs so that for example after a considerable period of heating at 900° F., the water content as determined by analysis is of the order of 2–3% which is firmly fixed and does not appreciably vary either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalysts may be repeatedly reactivated by passing air over the spent particles to burn off deposits of carbonaceous material at temperatures as high as 1400–1600° F. without material loss of catalytic activity.

According to the present process catalysts prepared by the general procedure described in the preceding paragraphs are utilized to the best advantage in cracking reactions when employed as filling material in tubes or chambers in the form of small pellets or granules. In the majority of cases wherein hydrocarbon fractions readily vaporizable at moderate temperatures without extensive decomposition are employed, the average particle size is within the range of 6–10 mesh, which may apply either to small pellets of uniform size and short cylindrical shape or to particles of irregular size and shape produced by the grinding and sizing of the partially dehydrated materials. While the simple method of preheating a given fraction of hydrocarbon oil vapors to a temperature suitable for their cracking in contact with the catalysts and then passing the vapors over a stationary mass of catalyst particles may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions.

After the passage of the oil vapors over the catalyst, the products may be separated into material unsuitable for further cracking, intermediate insufficiently converted fractions amenable to further catalytic cracking, gasoline boiling range materials and gases, the intermediate fractions being returned directly to admixture with the charging stock so that ultimately there is complete recycling of all fractions and maximum utilization of the charging stock for gasoline production.

The present process besides being characterized by the use of novel catalysts is further characterized by the use of moderate temperatures, relatively low pressures and high throughputs in comparison with strictly thermal cracking processes in use at the present time. When dealing with intermediate distillate fractions of the character of gas oil, it is seldom necessary to employ temperatures greatly in excess of 950° F. in the catalytic conversion zone. In the matter of pressure, it is seldom desirable to employ those materially above atmospheric except insofar as this is necessary to insure a proper flow through the vaporizing and cracking zones and the succeeding fractionating equipment. However, since pressure increases the capacity of both cracking and fractionating units, moderately superatmospheric pressures may be employed when their use is dictated by the overall economy of the process. The times of catalytic contact are relatively short and of the order of 1–10 seconds.

The following examples of preparation and use of the types of catalysts peculiar to the present invention are given to indicate their novelty and utility in practical cracking processes although not for the purpose of limiting the invention in exact agreement with the data introduced.

EXAMPLE I

In this example the method of catalyst preparation was generally to add a precipitate of aluminum hydroxide to a silica sol, the aluminum hydroxide having been freshly prepared by adding a solution of ammonia and sodium aluminate to aluminum chloride and the sol having been prepared by acidifying a solution of sodium silicate. The details of this procedure are given in the following paragraph.

A water solution of ammonium hydroxide and sodium aluminate was prepared by adding 174 cc. of concentrated ammonia (sp. gr. 0.90) in 350 cc. water to 209.6 grams aluminum chloride hexahydrate ($AlCl_3.6H_2O$) in 695 cc. water after which 208.4 grams sodium hydroxide (NaOH) in 1158 cc. water solution was added. This aluminate solution was added to a clear fluid silicic acid sol. This silicic acid sol had been prepared by adding 640 grams sodium silicate

($Na_2SiO_3.9H_2O$)

in 2 liters water to 750 cc. concentrated hydrochloric acid (sp. gr. 1.19) contained in 750 cc. water. The precipitate which formed, when the aluminate was added to the sol, did not become permanent until about half of the aluminate had been added. The mass was filtered and the filtrate had a pH of 8.2. The filter cake was stirred into a slurry in 2 liters of water and filtered, this last operation being performed 10 times. Filtration proceeded rapidly during the first few washes but became slower during the last washes. The filtered material was dried at 240° F., pressed into 6 to 10 mesh granules, and finally calcined at 932° F.

The above procedure produced a substantially pure silica-alumina catalyst with an approximate molal ratio of 5.25:1. The proportions of reactants employed in the precipitation and mixing was such that there was a good excess of ammonium chloride and a correspondingly easy filtration. Using granules of 6 to 10 mesh in a catalyst chamber, a paraffinic gas oil from the Pennsylvania field was preheated to a temperature of 932° F. and passed through the catalyst at a liquid space velocity of approximately 4 per hour. The following tabulation includes the important data obtained from the run.

*Data on cracking experiments*

|  | Run #1 | Run #2 |
|---|---|---|
| Temperature average at center of catalyst bed, °F. | 905 | 910 |
| Gasoline 400° F. E. P.: |  |  |
| Volume percent | 28.1 | 27.1 |
| Weight percent | 25.3 | 23.9 |
| A. P. I. @ 60° F. | 61.7 | 61.8 |
| Octane number, motor method | 75.3 | 75.4 |
| Engler distillation: |  |  |
| I. B. P. ° F. | 96 | 85 |
| 10% ° F. | 121 | 121 |
| 20% ° F. | 146 | 148 |
| 30% ° F. | 173 | 177 |
| 50% ° F. | 236 | 236 |
| 70% ° F. | 301 | 301 |
| 90% ° F. | 357 | 356 |
| E. P. ° F. | 401 | 399 |
| Gases (boiling range below +10° C.): |  |  |
| Weight percent (total) | 6.9 | 5.7 |
| Molecular weight | 36.9 | 33.6 |
| Propene and butenes weight percent of charge | 4.2 | 3.7 |
| Gas oil recovered (recycle stock): |  |  |
| Volume percent | 65.9 | 71.2 |
| Weight percent | 65.9 | 71.0 |
| A. P. I. @ 60° F. | 39.2 | 39.6 |

EXAMPLE II

The method of preparing the catalyst in this case was to add hydrochloric acid to an aqueous solution of sodium silicate to form a sol, then adding aluminum chloride solution and finally the required excess of ammonium hydroxide to produce a precipitate. The details of the preparation of this catalyst were as follows:

488 grams 40° Bé. water glass dissolved in 3 liters water was added slowly to 400 cc. concentrated hydrochloric acid, sp. gr. 1.19, contained in 3 liters water. No precipitate resulted and the solution was acid. After one half hour 182 grams aluminum chloride hexahydrate ($AlCl_3.6H_2O$) dissolved in 1 liter water was added to the above, still with no precipitation. After an additional 20 minutes 208 cc. concentrated ammonia in 490 cc. water was added, making the mixture basic to red litmus. The resultant precipitate was filtered and the filter cake stirred into a slurry in 2 liters of water and filtered, this last operation being performed 10 times. The washes filtered rapidly for the first few times but slowly during the final washes. The filter cake was dried at 240° F., pressed into 6-10 mesh granules and calcined at 932° F. This method of preparation gave finally a catalyst in which the ratio of silica to alumina was substantially 6:1.

The following tabulation again gives the results obtained in the once through cracking of the same paraffinic gas oil as was used in Example 1.

*Data on cracking experiments*

|  | Run #1 | Run #2 |
|---|---|---|
| Temperature (average at center of catalyst bed, °F.) | 890 | 897 |
| Gasoline 400° F. E. P.: |  |  |
| Volume percent | 29.4 | 29.5 |
| Weight percent | 26.4 | 26.4 |
| A. P. I. @ 60° F. | 61.3 | 61.8 |
| Octane number, motor method | 75.9 | 75.7 |
| Engler distillation: |  |  |
| I. B. P. °F. | 91 | 98 |
| 10 percent °F. | 120 | 139 |
| 20 percent °F. | 144 | 165 |
| 30 percent °F. | 171 | 190 |
| 50 percent °F. | 229 | 243 |
| 70 percent °F. | 295 | 304 |
| 90 percent °F. | 355 | 356 |
| E. P. °F. | 402 | 400 |
| Gases (boiling range below +10° C.): |  |  |
| Weight percent | 7.4 | 6.7 |
| Molecular weight | 35.4 | 37.3 |
| Propene and butenes, weight percent of charge | 4.6 | 4.2 |
| Gas oil recovered (recycle stock): |  |  |
| Volume percent | 63.3 | 63.0 |
| Weight percent | 63.5 | 63.0 |
| A. P. I. @ 60° F. | 38.9 | 39.2 |

EXAMPLE III

The procedure in this instance consisted in adding an aqueous solution of sodium silicate to a solution of aluminum chloride to form a hydrated alumina-silica precipitate and later adding sufficient ammonia to insure complete precipitation in the presence of an excess of ammonium chloride. The details of the operation were as follows:

A solution consisting of 284.2 grams of sodium silicate hydrate ($Na_2SiO_3.9H_2O$) in 1.333 liters of water was added slowly with stirring to 482.86 grams of aluminum chloride hexahydrate ($AlCl_3.6H_2O$) dissolved in 1.333 liters of water. To the resulting mixture 333 cc. of concentrated ammonium hydroxide solution (sp. gr. 0.90) was added. 2.333 liters of water were then added and the mixture allowed to stand at room temperature for 18 hours. The mass was then filtered, and the filter cake was removed, stirred into a slurry with a solution containing 13.38 grams ammonium chloride and 2.5 cc. concentrated ammonium hydroxide per liter after which the slurry was again filtered, this operation being performed 7 times. The filter cake was then stirred into a slurry in 2 liters of the ammonium hydroxide ammonium chloride solution, this last operation being performed 8 times. The mass was dried, formed under pressure into 6-10 mesh granules and finally dried at 932° F., this procedure producing ultimately catalysts in which the ratio of silica to alumina was substantially 1:1. The results obtained in cracking paraffinic gas oil with this catalyst are given below:

*Data on cracking experiments*

|  | Run #1 | Run #2 |
|---|---|---|
| Temperature average at center of catalyst bed, °F | 900 | 900 |
| Gasoline 400° F. E. P.: |  |  |
| Volume percent | 25.8 | 26.7 |
| Weight percent | 22.9 | 23.8 |
| A. P. I. @ 60° F. | 60.7 | 60.8 |
| Octane number, motor method | 77.8 | 77.6 |
| Engler distillation: |  |  |
| I. P. B. ° F. | 87 | 90 |
| 10 percent | 119 | 123 |
| 20 percent | 140 | 145 |
| 30 percent | 164 | 171 |
| 50 percent | 224 | 234 |
| 70 percent | 292 | 303 |
| 90 percent | 348 | 357 |
| E. P. °F. | 400 | 401 |
| Gases (boiling range below +10° C.): |  |  |
| Weight, percent | 8.6 | 7.5 |
| Molecular weight | 40.0 | 39.4 |
| Propene and butenes, weight, percent of charge | 5.8 | 5.0 |
| Gas oil recovered, recycle stock: |  |  |
| Volume, percent | 67.1 | 67.7 |
| Weight, percent | 67.2 | 67.7 |
| A. P. I. @ 60° F. | 39.1 | 39.3 |

EXAMPLE IV

The method of catalyst preparation in this case consisted in adding ammonium hydroxide solution to aqueous sodium silicate and then adding this solution to a solution of aluminum chloride to form the required precipitate. The details of this procedure were as follows:

333 cc. concentrated ammonium hydroxide solution (sp. gr. 0.90) was added to 284.2 grams sodium silicate ($Na_2SiO_3.9H_2O$) in 1333 cc. water. This mixed solution was then added to 482.85 grams aluminum chloride hexahydrate ($AlCl_3.6H_2O$) in 133 cc. water after which 2333 cc. water was added. The mixture was allowed to stand 48 hours after which it was filtered. The filter cake was stirred into a slurry in 2 liters water and filtered, this last operation being performed 20 times. The catalyst mass was dried at 240° F., pressed into 6-10 mesh granules and finally calcined at 932° F. The catalyst prepared by this procedure consisted of a silica-alumina mass in which the ratio of the oxides was approximately 1:1.

The results obtained in cracking the paraffinic gas oil with this catalyst are shown in the following tabulation:

*Data on cracking experiments*

|  | Run #1 | Run #2 |
|---|---|---|
| Temperature average at center of catalyst bed, °F | 895 | 895 |
| Gasoline 400° F. E. P.: | | |
| Volume percent | 28.4 | 28.7 |
| Weight percent | 25.2 | 25.5 |
| A. P. I. @ 60 °F | 61.2 | 61.0 |
| Octane number, motor method | 77.4 | 77.2 |
| Engler distillation: | | |
| I. P. B. °F | 88 | 86 |
| 10% | 120 | 118 |
| 20% | 142 | 146 |
| 30% | 167 | 178 |
| 50% | 230 | 250 |
| 70% | 298 | 315 |
| 90% | 356 | 365 |
| E. P. °F | 400 | 400 |
| Gases (boiling range below +10° C.): | | |
| Weight percent | 7.0 | 5.7 |
| Molecular weight | 30.9 | 27.8 |
| Propene and butenes, weight percent of charge | 4.4 | 3.5 |
| Gas oil recovered, recycle stock: | | |
| Volume percent | 67.0 | 68.7 |
| Weight percent | 67.2 | 68.9 |
| A. P. I. @ 60° F | 38.9 | 38.9 |

EXAMPLE V

The manufacture of the catalyst in this case is an example of the use of a metal salt to replace sodium ions present in a primary precipitate which in the present instance is also one having a relatively high silica-alumina ratio. The general procedure, the details of which are given below, was to add a solution of aluminum chloride to a solution of sodium silicate in a relatively large volume of water, add hydrochloric acid to acidity and then a further quantity of aluminum chloride solution. Procedure: 40.24 grams aluminum chloride hexahydrate ($AlCl_3.6H_2O$) in 500 cc. water was added to 568.4 grams sodium silicate ($Na_2SiO_3.9H_2O$) in 3000 cc. water. A precipitate was formed, 297 cc. concentrated hydrochloric acid solution (sp. gr. 1.19) was then added which made the mixture slightly but definitely acidic to blue litmus. Then 40.24 grams aluminum chloride hexahydrate ($AlCl_3.6H_2O$) in 500 cc. water was added to the mixture. After standing at room temperature for fifteen hours the mixture was filtered. The filter cake was stirred into a slurry in two liters of water and filtered. This last operation was performed fifteen times. The filter cake was dried at 300° F. and pressed into 6–10 mesh granules. After calcining at 932° F. the weight was 93.0 grams (volume 155 cc. apparent density 0.600). The molal ratio of silica to alumina in the catalyst granules as finally prepared was approximately 24:1.

The paraffinic gas oil used in the preceding examples was passed through the catalyst prepared as above at a temperature of about 900° F. and substantially atmospheric pressure to produce a once through yield of approximately 31% by volume of 400 end point gasoline having an octane number of 76 by the motor method.

EXAMPLE VI

The following comparative data are introduced to show the results obtained with a silica-alumina catalyst which was prepared by the primary coprecipitation of hydrated silica and hydrated alumina from aqueous solution without observing proper precautions as to the washing of the precipitate to remove alkali metal ions. The catalyst was prepared by treating a commercial 40° Bé. water glass solution (approximating $$Na_2O:3.3SiO_2$$

with a sufficient quantity of aluminum chloride solution to react with all the sodium of the water glass to form sodium chloride. The precipitate was washed with water until the wash water was free of cations, then dried and calcined. The final silica-alumina ratio was 10:1 which is within the range for producing good cracking catalysts when observing the proper precautions about the removing of alkali metal ions. In the following table the data obtained in the cracking of paraffinic gas oil are given.

*Data on cracking experiments*

|  | Run #1 | Run #2* |
|---|---|---|
| Av. temp. at center of catalyst bed, °F | 915 | 916 |
| Gasoline, 400° F. end point: | | |
| Vol. percent | 18.9 | 12.9 |
| Wt. percent | 17.1 | 11.7 |
| A. P. I. gr. @ 60° F | 57.7 | 56.3 |
| Octane number, motor method | 71 | 72 |
| Engler distillation of gasoline: | | |
| I. B. P. | 95 | 108 |
| 10 percent | 154 | 175 |
| 20 percent | 193 | 212 |
| 30 percent | 226 | 244 |
| 40 percent | 252 | 268 |
| 50 percent | 274 | 289 |
| 70 percent | 296 | 323 |
| 90 percent | 317 | 360 |
| E. P. | 400 | 400 |
| Gas boiling below +10° C.: | | |
| Weight percent | 1.9 | 2.0 |
| Molecular weight | 32.8 | 30.1 |
| Propene+butenes | 1.2 | 1.2 |
| Gas oil recovered, recycle stock: | | |
| Vol. percent | 80.0 | 85.3 |
| Wt. percent | 80.0 | 85.3 |
| A. P. I. gravity | 40.6 | 40.6 |

* After one reactivation.

The above data shows that when no special care was taken to remove sodium ions that the gasoline yields were markedly lower, that the octane number of the gasoline produced was lower and that there was considerable loss in catalytic activity after reactivation which supports the previously stated hypothesis that the presence of alkali metal ions in the composites tends to cause a fluxing action which spoils the catalyst structure.

The novelty and utility of the present invention are evident from a consideration of the foregoing descriptive and numerical sections respectively although neither is intended to impose undue limitations upon its proper scope.

We claim as our invention:

1. A process for converting hydrocarbon distillates heavier than gasoline into substantial yields of gasoline which comprises subjecting said distillate under cracking conditions to contact with a catalyst produced by separately precipitating hydrated aluminum oxide and hydrated silicon dioxide containing alkali metal, freeing the precipitated materials of alkali metal ions, mixing the purified materials in the wet condition, and drying to remove a major portion of the total water content.

2. A process for converting hydrocarbon distillates heavier than gasoline into substantial yields of gasoline which comprises subjecting said distillate under cracking conditions to contact with a catalyst free of alkali metal and produced by concurrently precipitating hydrated aluminum oxide and hydrated silicon dioxide by the inter-action of a soluble aluminum compound and an alkali metal silicate in an aqueous menstruum, adding a sufficient quantity of an ammonium compound to replace combined or adsorbed alkali metals present in the precipitate with ammonium, filtering and washing the precipitated material to substantially complete removal of soluble substances, and heating the washed precipitate to remove the major portion of the total water content.

3. A process for converting hydrocarbon distillates heavier than gasoline into substantial yields of gasoline which comprises subjecting said distillates under cracking conditions to contact with a catalyst free of alkali metal and produced by separately precipitating hydrated aluminum oxide and hydrated silicon dioxide containing alkali metal, mixing said separately produced precipitates in a wet condition, adding a sufficient quantity of an ammonium compound to replace combined or adsorbed alkali metals present in the precipitate with ammonium, filtering and washing the precipitated material to substantially complete removal of soluble substances and heating the washed precipitate to remove the major portion of its total water content.

4. A process for converting hydrocarbon distillates heavier than gasoline into substantial yields of gasoline which comprises subjecting said distillates under cracking conditions to contact with a catalyst free of alkali metal and produced by separately precipitating hydrated aluminum oxide and hydrated silicon dioxide, mixing said separately produced precipitates in a wet condition, adding a sufficient quantity of a solution of an aluminum salt to replace combined or adsorbed alkali metals present in the precipitate with aluminum, filtering and washing the precipitated material to substantially complete removal of soluble substances and heating the washed precipitate to remove the major portion of its total water content.

5. A process for converting hydrocarbon distillates heavier than gasoline into substantial yields of gasoline which comprises subjecting said distillates under cracking conditions to contact with a catalyst free of alkali metal and produced by separately precipitating hydrated aluminum oxide and hydrated silicon dioxide, adding a sufficient quantity of a solution of an aluminum salt to a suspension of the hydrated silicon dioxide to replace combined or adsorbed alkali metals with aluminum, mixing said separately produced precipitates in a wet condition, filtering and washing the precipitated material to substantially complete removal of soluble substances and heating the washed precipitate to remove the major portion of its total water content.

6. A process for converting hydrocarbon distillates heavier than gasoline into substantial yields of gasoline which comprises subjecting said distillates under cracking conditions to contact with a catalyst free of alkali metal and produced by separately precipitating hydrated aluminum oxide and hydrated silicon dioxide, treating said hydrated silicon dioxide with a mineral acid followed by washing with water to remove combined or adsorbed alkali metals, mixing said separately produced precipitates in a wet condition, filtering and washing the precipitated material to substantially complete removal of soluble substances and heating the washed precipitate to remove the major portion of its total water content.

7. A process for converting hydrocarbon distillates heavier than gasoline into substantial yields of gasoline which comprises subjecting said distillates under cracking conditions to contact with a catalyst free of alkali metal and produced by separately precipitating hydrated aluminum oxide from a solution of a soluble aluminate and hydrated silicon dioxide by the acidification of alkali metal silicate solution, mixing said separately produced precipitates in a wet condition, adding a sufficient quantity of an ammonium compound to replace combined or adsorbed alkali metals present in the precipitate with ammonium, filtering and washing the precipitated material to substantially complete removal of soluble substances and heating the washed precipitate to remove the major portion of the total water content.

8. A conversion process which comprises subjecting hydrocarbon oil to cracking conditions in the presence of a calcined mixture of separately precipitated alumina hydrogel and silica hydrogel, said hydrogels having been combined in undried condition prior to the calcination and said mixture being substantially free of alkali metal.

9. A process for producing gasoline from hydrocarbon distillates heavier than gasoline which comprises subjecting the distillate in vapor phase to cracking conditions in the presence of a calcined mixture of separately precipitated alumina hydrogel and silica hydrogel, said hydrogels having been combined in undried condition prior to the calcination and said mixture being substantially free of alkali metal.

10. A process for converting hydrocarbon distillates heavier than gasoline into substantial yields of gasoline which comprises subjecting said distillate under cracking conditions to contact with a catalyst produced by precipitating hydrated aluminum oxide from an aqueous solution of a soluble aluminum compound, separately precipitating hydrated silicon dioxide from an aqueous solution of an alkali metal silicate, combining the precipitates in undried condition and removing from the hydrated silicon dioxide alkali metal ions present therein as a result of its precipitation from the alkali metal silicate solution, and calcining the commingled precipitates.

11. A conversion process which comprises contacting normally liquid hydrocarbon oil under cracking conditions with a catalyst produced by precipitating hydrated silicon dioxide containing alkali metal, precipitating hydrated aluminum oxide, treating resultant precipitated material, containing said alkali metal, with an aqueous solution of a compound having a cation capable of replacing alkali metal ions and combining the precipitated aluminum oxide and silicon dioxide in undried condition, and drying the mixture to remove the major portion of its water content.

12. The process as defined in claim 11 further characterized in that the hydrated aluminum oxide is substantially free of alkali metal and the hydrated silicon dioxide is treated with said solution prior to combining it with the hydrated aluminum oxide, the latter being precipitated in the presence of the hydrated silicon dioxide.

13. The process as defined in claim 11 further characterized in that the aluminum oxide and silicon dioxide are co-precipitated and the admixed precipitates treated with said solution.

14. The process as defined in claim 11 further characterized in that the aluminum oxide and silicon dioxide are precipitated independently of each other.

15. The process as defined in claim 11 further characterized in that said oil is a distillate heavier than gasoline.

16. The process as defined in claim 8 further characterized in that the silica hydrogel is precipitated prior to the alumina hydrogel and the latter thereafter precipitated in the presence of the silica hydrogel.

17. The process as defined in claim 8 further characterized in that the silica hydrogel is precipitated prior to the alumina hydrogel and suspended in an aqueous aluminum salt solution, the alumina hydrogel being combined with the silica hydrogel by precipitating the same from said solution in the presence of the silica hydrogel.

CHARLES L. THOMAS.
JACOB E. AHLBERG.